Figure 1:
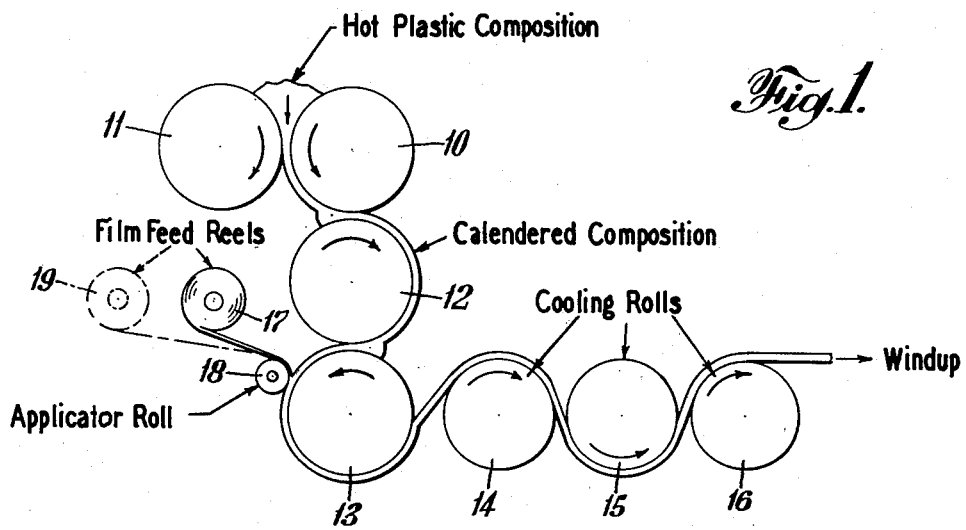

Nov. 20, 1956   J. F. ROCKY ET AL   2,771,388
METHOD OF LAMINATING LAYERS OF THERMOPLASTIC FOIL
Filed June 18, 1953

INVENTORS
JOSEPH F. ROCKY
FRANK R. NISSEL
BY Louis C. Smith
ATTORNEY

United States Patent Office 2,771,388
Patented Nov. 20, 1956

2,771,388

METHOD OF LAMINATING LAYERS OF THERMOPLASTIC FOIL

Joseph F. Rocky, Union, and Frank R. Nissel, Plainfield, N. J., assignors to Union Carbide and Carbon Corporation, a corporation of New York Application June 18, 1953, Serial No. 362,549

3 Claims. (Cl. 154—102)

This invention relates to thermoplastic foil and to an improved method for continuously laminating multiple layers thereof into a unitary and homogeneous foil.

Thermoplastic foil of various thicknesses may be prepared by any of the well-known methods in the art. Those foils having a thickness of less than 0.010 inch are normally termed "films" while those foils having a thickness of or above such value are normally termed "sheets." Numerous commercial applications require the use of laminated foil; for example, when preparing inflatable items made of a thermoplastic material it has been found that a single foil is not entirely satisfactory as oftentimes such foil may contain minute holes which impair the usefulness of the product, whereas a laminate is most desirable since the possibility of a conjunction of such holes in the respective layers is extremely small.

Heretofore, various methods have been proposed for preparing laminated foils. Such methods, for the most part, include the feeding of at least two foils from reels thereof between the bight or nip of a pair of heated rolls. The foils as they pass between the rolls are heated and become soft, while, at the same time, the pressure exerted by such rolls upon the foils serves to effect a bond therebetween. Modifications of this method have included the heating of the foils by hot air by their passage through heated chambers prior to passage between the heated rolls and the additional heating of the laminated foils after passage between the heated rolls or the passage of the laminated foils between additional heated rolls.

The above method and the various modifications thereof for preparing laminated foils has not proven entirely satisfactory as oftentimes the bond prepared thereby is not of sufficient strength for many applications of the laminate. Moreover, difficulty has been encountered in obtaining a uniform bond between the laminated foil and in correlating the amount of heat supplied to the rolls and the pressure they exert so as to prevent damage to the foils during the process.

It has also been proposed to effect lamination of thermoplastic foils by placing such foils in a flat press and heating the foils to a temperature sufficient to cause adhesion thereof. While this method may yield a satisfactory product for many purposes, it has many disadvantages. Perhaps the primary disadvantage is that the time required for each pressing cycle precludes rapid production of continuous laminated foils.

This invention overcomes the disadvantages of previously known processes for preparing a laminate comprising thermoplastic foil. The principal object of the invention is to provide an improved, economical and efficient method, capable of continuous operation, for preparing composite materials comprising thermoplastic foil.

The method of this invention broadly comprises continuously forming a foil of a thermoplastic composition with the aid of heat and pressure in a calendering operation, and after the foil has passed through the last bight or last reducing portion of the calendering apparatus and while it is about the heated bottom calendering roll, continuously applying to and pressing against such foil, a previously prepared foil. Since the foil being calendered is at a high temperature and is quite tacky, lamination of the previously prepared foil and the foil being calendered is immediate and the foils are fused into a unitary and homogeneous foil.

A unique aspect of our invention is that since our method provides an extremely tacky foil as one of the components of the laminate, due to the high calendering temperatures, we obtain a complete fusion of the foils. This aspect makes possible the production of laminates comprising dissimilar thermoplastic foils and also makes possible the production of a laminate comprising a thermoplastic foil and a film, sheet or layer of any material so long as such material will adhere to such foil.

An additional advantage of the invention is that lamination is effected with a minimum amount of handling as it is not necessary to subject the foils to heated pressure surfaces such as rolls, platens or belts. This feature makes possible the application of a thin, solution cast, film of 0.001" or less, to the foil being calendered without incurring the possibilities of damaging such film. Moreover, due to the manner in which lamination is effected by our method, we may apply a foil containing printed matter or various designs, on one surface, to the thermoplastic foil being calendered, without the possibility of damaging such surface.

The thermoplastic foil which comprises one part of the laminate prepared by our process must be prepared from a composition adapted for calendering. Examples of such compositions include polyvinyl chloride, copolymers of vinyl chloride prepared by the copolymerization of vinyl chloride with another polymerizable compound; unvulcanized rubber and the like. Foils prepared from such compositions may be rigid or elastomeric and may contain any of the well-known modifiers such as lubricants, plasticizers, stabilizers, fillers, dyes or pigments. Such thermoplastic foils are prepared as a part of our process and may vary in gauge from relatively thin films to sheets, depending on the desired thickness of the laminate.

The foil or foils to be applied to the thermoplastic foil may be prepared, as indicated above, from any material which will adhere thereto. However, we prefer to employ a thermoplastic foil. Such foil may be rigid or elastomeric and may contain any of the well-known modifiers such as lubricants, plasticizers, stabilizers, fillers, dyes or pigments. The thickness of the applied foil or foils may vary from extremely thin, solution cast films of 0.001" or less in thickness to sheets.

Figure 2:
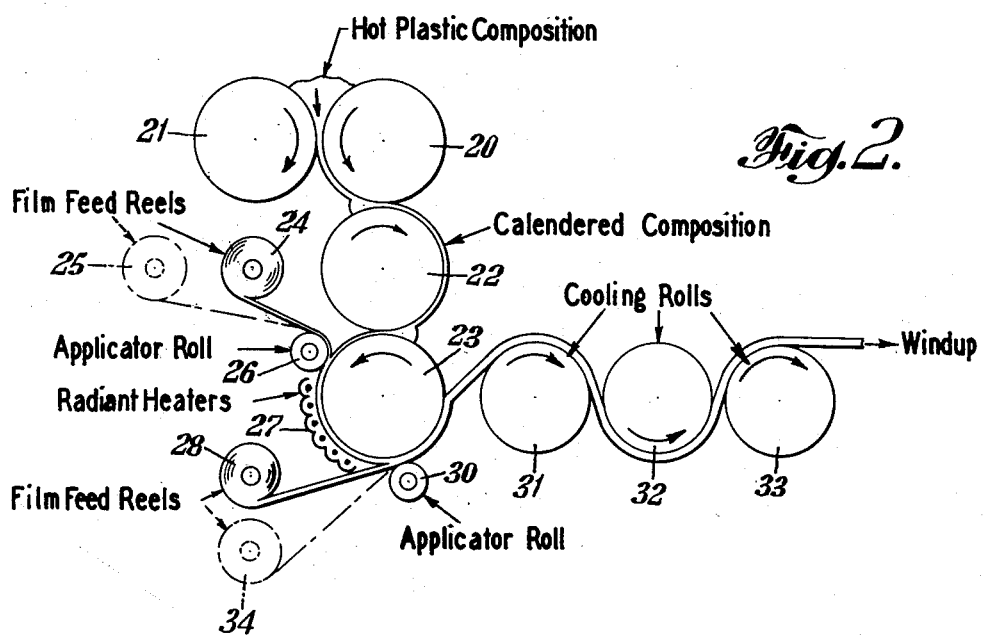

Our invention will be best understood and appreciated from the following description of a preferred embodiment thereof disclosed in connection with the representative apparatus shown in the following drawings, wherein:

Fig. 1 illustrates in side elevation, a conventional four-roll calender in operation with means for supplying a previously calendered foil to the bottom roll of the calender, and Fig. 2 illustrates in side elevation, a conventional four-roll calender in operation with means for supplying two previously calendered foils to the bottom roll of the calender.

Referring to Fig. 1 of the drawings, the calendering apparatus comprises a top roll 10 and adjacent thereto an offset roll 11. Positioned beneath the top roll are the middle roll 12 and the bottom roll 13. All of the rolls are suitably heated by means not shown. In the normal calendering operation, a heated thermoplastic composition is charged to the bight between the top and offset rolls which are rotating in the direction shown by the arrows. The foil as it emerges from between the top and offset rolls is directed between the top and middle rolls and is then directed between the middle and bottom rolls and after passage between these rolls, the tacky foil, which now adheres to the surface of the bottom roll, travels therewith. As is known the bight or bights of a calender generally serve to reduce the thickness of a film being calendered and thus may be referred to as the reducing portions of such calender.

Lamination is effected in accordance with our invention by continuously supplying a previously prepared thermoplastic foil from a reel 17, and applying such foil, by means of an applicator roll 18, against the heated tacky foil after it has passed between the middle and bottom rolls and while it is traveling with the surface of the bottom roll. Due to the tacky nature of the foil being calendered, the foils are immediately fused into a unitary and homogeneous sheet.

After the foils are united, they continue traveling with the surface of bottom roll until they are subsequently stripped therefrom and passed about cooling rolls 14, 15 and 16 and wound up as is normally done in the conventional calendering operation. To insure a continuous supply of the previously prepared foil, an alternating feed reel 19 may be so positioned as to supply such foil when the initial reel is exhausted.

In the embodiment of the invention disclosed in Fig. 2, means are provided for laminating three foils prepared from thermoplastic compositions. More particularly, those parts of the calendering apparatus comprising a top roll 20, an offset roll 21, a middle roll 22 and a bottom roll 23, and the initial film supply and pressure exerting means respectively comprising alternating feed reels 24 and 25, and applicator roll 26 are identical with those shown in Fig. 1. The foil supplied from either reel 24 or reel 25 is bonded to the heated tacky foil adhering to and traveling with the bottom calendering roll in a manner similar to that described for laminating two films.

Heating means in the form of radiant heaters 27 are positioned beneath the applicator roll 26 and about a portion of the bottom roll 23 and serve to heat the laminate, particularly the outer foil thereof, to make it relatively tacky. Addition of the third foil is accomplished by continuously supplying such foil from reel 28 and pressing it against the laminate by means of applicator roll 30, as it travels with the surface of the roll and after it has been subjected to the radiant heaters. As the outer surface of the laminate comprising the two foils is heated by means of radiant heat in addition to being heated by means of conduction from the bottom calendering roll, it is tacky and the additional foil applied to the surface thereof readily adheres thereto. Thus by employing this embodiment of our invention, a homogeneous laminate comprising three foils is prepared.

After lamination is effected, the foil continues to travel with the surface of the bottom roll and is subsequently stripped therefrom and passed about cooling rolls 31, 32 and 33 and wound up on a reel. To insure a continuous supply of the third foil, an alternating film feed reel 34 may be so positioned as to supply such foil when the initial reel 28 is exhausted.

The following examples more fully illustrate the invention:

EXAMPLE I

*Laminating films of elastomeric thermoplastic compositions*

A calenderable composition was prepared by fluxing the following materials, in the proportions indicated, in a Banbury mixer and by subsequently milling the mixture on a two-roll mill to produce a hot plastic mass.

| | Percent by weight of total composition |
|---|---|
| Polyvinyl chloride resin | 67 |
| Dioctyl phthalate (plasticizer) | 31.5 |
| Dibutyl tin dilaurate (stabilizer) | 1.5 |

The hot plastic composition was charged into the bight between rolls 10 and 11 of the calendering apparatus shown in Fig. 1. Top roll 10 had a surface temperature of 160° C. and offset roll 11 had a surface temperature of 155° C. The sheeted plastic as it emerged from between rolls 10 and 11 was directed between rolls 10 and 12. From roll 12 the sheet passed between rolls 12 and 13, so adjusted as to produce a film thickness of 0.006". Middle roll 12 had a surface temperature of 165° C. while bottom roll 13 had a surface temperature of 170° C. Calendering was conducted at a speed to produce 80 feet of film per minute.

As the film emerges from between the middle and bottom rolls it is extremely hot and tacky and adheres to and travels with the surface of the bottom roll. A previously calendered thermoplastic elastomeric film of 0.004" thickness and prepared from a composition identical with that of the film being calendered, was fed from supply reel 17, at a speed of 80 feet per minute, and applied by means of applicator roll 18, against the heated tacky film. Such application was effected after the heated tacky film had emerged from between the middle and bottom rolls and while it adhered to and traveled with the surface of the bottom roll.

Due to the elevated temperature (155°–170° C.) at which the calendering operation is conducted, the films are immediately and completely fused into a unitary and homogeneous sheet of 0.010" thickness. The laminate after it is thus prepared continues traveling with the surface of the bottom roll and is subsequently stripped therefrom, cooled and wound-up.

The laminate differs from many made by other processes in that complete fusion of the components is obtained. This is readily shown as a portion of the laminate, prepared above, was immersed in ethyl acetate for a period of time. Ethyl acetate is a solvent for the plasticizer and leaches it from the films. Thus nonfused or incompletely fused laminates which may be inseparable by hand, came part when immersed in the solvent due to leaching action. The laminate prepared in the above manner remained inseparable after immersion in the solvent.

EXAMPLE II

*Laminating sheets of rigid thermoplastic compositions*

A calenderable composition was prepared by fluxing the following materials in the proportions indicated, in a Banbury mixer and by subsequently milling the mixture on a two-roll mill to produce a soft plastic mass.

| | Percent by weight of total composition |
|---|---|
| Copolymer resin of vinyl chloride and vinyl acetate resin | 87.5 |
| Dibutyl tin dilauryl mercaptide (stabilizer) | 2 |
| Titanium dioxide (pigment) | 10 |
| Stearic acid | 0.5 |

The composition in a soft plastic condition was charged into the bight between rolls 10 and 11 of the calendering apparatus shown in Fig. 1. Top roll 10 had a surface temperature of 150° C. and offset roll 11 had a surface temperature of 155° C. while the middle and bottom rolls 12 and 13 had respective surface temperatures of 145° C. and 140° C. As no plasticizer was added to the composition, a rigid sheet of the thermoplastic composition was calendered. The calendering rolls were so adjusted as to prepare a sheet of 0.010" thickness and the operation was conducted at a speed to produce 50 feet of sheeting per minute.

As the film emerges from between the middle and bottom rolls, it is extremely hot and tacky and adheres to and travels with the surface of the bottom roll. A previously calendered thermoplastic rigid sheet of 0.010" thickness, and prepared from a composition identical to that of the rigid sheet being calendered, was fed from supply reel 17 at a speed of 50 feet per minute and applied, by means of applicator roll 18, against the heated tacky sheet. Such application was effected after the tacky sheet had emerged from between the middle and bottom rolls and while it adhered to and traveled with the surface of the bottom roll.

Due to the elevated temperatures (140° C.–155° C.) at which the calendering operation is conducted, the films are immediately and completely fused into a unitary and homogeneous sheet of 0.020" thickness. The laminate after it is thus prepared, continues traveling with the surface of the bottom roll and is subsequently stripped therefrom, cooled and wound up.

The lamination of rigid sheets according to our invention is particularly desirable as we obtain a homogeneous laminate having uniformly smooth surfaces. Normally, a rigid sheet, when prepared in a calendering operation, has the one surface, that is not in contact with the last calendering roll, rough and not uniform. However by employing our method, a rigid sheet having both surfaces, smooth and uniform may be prepared by laminating two sheets whose total thickness is equal to the desired thickness. As the sheet being calendered has its uneven surface away from the last roll, we may apply the previously prepared sheet in such a manner that its uneven surface is applied against the uneven surface of the calendered sheet.

The speeds at which the thermoplastic foils may be laminated depend on the speed at which the foil being calendered is produced. For example, films of elastomeric polyvinyl chloride compositions may be prepared on calendering apparatus at speeds up to 200 or more feet per minute and thus lamination by our method may be effected at such speeds. On the other hand, rigid polyvinyl chloride sheets are prepared at speeds up to 100 or more feet per minute and, therefore, lamination of foil thereto will be effected at those speeds.

From the above description and examples, it is readily seen that our invention provides a unique and rapid method of laminating thermoplastic foils. Moreover, as we apply a previously prepared foil to the heated, tacky thermoplastic foil after such thermoplastic foil has been reduced to its final thickness, we obtain a fusion of layers without incurring the possibility of damage to either foil.

While the invention has been described with particular reference to certain preferred embodiments thereof, it is to be understood that the invention is not solely limited thereto for, as disclosed, it is possible to provide modifications of the disclosed process without departing from the spirit and scope of the invention as defined in the appended claims.

We claim:

1. A method for continuously preparing a homogeneous sheet comprising laminated thermoplastic foils which comprises charging a heated thermoplastic composition to the bight between two heated rolls of a calender, calendering said thermoplastic composition to a thermoplastic foil, said foil being in a heated tacky condition and adhering directly to the surface of the last heated calender roll after passage through a bight formed in part by said last calender roll, applying a previously prepared thermoplastic foil against said heated tacky thermoplastic foil after said heated tacky thermoplastic foil has passed through said bight formed in part by said last heated calender roll and while said heated tacky thermoplastic foil remains adhered directly to and travels with the surface of said last heated calender roll, said previously prepared thermoplastic foil becoming fused to said heated tacky thermoplastic foil to form a homogenerous sheet while said heated tacky thermoplastic foil remains adhered directly to and travels with the last heated calender roll and thereafter removing said formed homogeneous sheet of fused thermoplastic foils from said last heated calender roll.

2. A method for continuously preparing a homogeneous sheet comprising laminated rigid thermoplastic sheets which comprises charging a heated normally rigid thermoplastic composition to the bight between two heated rolls of a calender, calendering said normally rigid thermoplastic composition to a rigid thermoplastic sheet, said sheet being in a heated tacky condition and adhering directly to the surface of the last heated calender roll after passage through a bight formed in part by said last calender roll, applying a previously prepared rigid thermoplastic sheet against said heated tacky rigid thermoplastic sheet, after said heated tacky rigid thermoplastic sheet has passed through said bight formed in part by said last heated calender roll and while said heated tacky rigid thermoplastic sheet remains adhered directly to and travels with the surface of said last calender roll, said previously prepared rigid thermoplastic sheet becoming fused to said heated tacky rigid thermoplastic sheet to form a homogeneous sheet while said heated tacky rigid thermoplastic sheet remains adhered directly to and travels with the last heated calender roll and thereafter removing said formed homogeneous sheet of fused rigid thermoplastic sheets from said last heated calender roll.

3. A continuous method of preparing a laminate comprising thermoplastic foils which comprises charging a heated thermoplastic composition to a calendering apparatus, calendering said thermoplastic composition to a thermoplastic foil, said foil being in a heated tacky condition after passage through the reducing portions of said calender and adhering directly to the surface of the last heated calender roll after being reduced to its desired thickness, applying a previously prepared thermoplastic foil against said heated tacky thermoplastic foil after said heated tacky thermoplastic foil has passed through said reducing portion and while said heated tacky thermoplastic foil remains adhered directly to and travels with the surface of said last heated calender roll, said previously prepared thermoplastic foil becoming fused to said heated tacky thermoplastic foil to form a homogeneous sheet while said heated tacky thermoplastic foil remains adhered directly to and travels with the last heated calender roll, externally heating said homogeneous sheet of thermoplastic foils as it travels with and remains adhered directly to the surface of the last calender roll, applying a second previously prepared foil against said heated homogeneous sheet as said homogeneous sheet remains adhered directly to and travels with the surface of said last heated calender roll to form a homogeneous sheet of three fused thermoplastic foils and thereafter removing said homogeneous sheet of fused thermoplastic foils from the last heated calender roll.

References Cited in the file of this patent
UNITED STATES PATENTS

| | | |
|---|---|---|
| 2,649,134 | Steinle | Aug. 18, 1953 |
| 2,700,630 | Bukey et al. | Jan. 25, 1955 |